(12) United States Patent
Rodgers

(10) Patent No.: US 8,720,768 B2
(45) Date of Patent: May 13, 2014

(54) MULTI-PLY MAILER WITH MULTIPLE DETACHABLE ELEMENTS

(75) Inventor: Gordon Rodgers, Las Vegas, NV (US)

(73) Assignee: R.R. Donnelley & Sons Company, Chicago, IL (US)

( * ) Notice: Subject to any disclaimer, the term of this patent is extended or adjusted under 35 U.S.C. 154(b) by 467 days.

(21) Appl. No.: 12/578,759

(22) Filed: Oct. 14, 2009

(65) Prior Publication Data

US 2011/0084122 A1 Apr. 14, 2011

(51) Int. Cl.
*B65D 27/00* (2006.01)
*B42D 15/00* (2006.01)

(52) U.S. Cl.
USPC ........................................ 229/92.1; 229/92.8

(58) Field of Classification Search
USPC ........................................ 229/92.8, 92.1, 300
See application file for complete search history.

(56) References Cited

U.S. PATENT DOCUMENTS

| | | | |
|---|---|---|---|
| 3,140,818 A | | 7/1964 | Sheldon |
| 3,273,785 A | | 9/1966 | Beckman et al. |
| 3,512,780 A | * | 5/1970 | Allison ........................ 273/139 |
| 3,523,638 A | * | 8/1970 | Moonan ....................... 229/92.1 |
| 3,726,471 A | | 4/1973 | Kalb |
| 3,999,700 A | | 12/1976 | Chalmers |
| 4,551,373 A | * | 11/1985 | Conlon ........................... 428/43 |
| 4,817,989 A | | 4/1989 | Pendergast |
| 4,892,246 A | * | 1/1990 | Norman ....................... 229/92.8 |
| 4,957,311 A | | 9/1990 | Geisenheimer |
| 5,076,490 A | | 12/1991 | Dulin |
| 5,125,689 A | * | 6/1992 | Heninger ...................... 283/106 |
| 5,255,456 A | * | 10/1993 | Franklin ................... 40/124.191 |
| 5,417,458 A | | 5/1995 | Best et al. |
| 5,439,255 A | | 8/1995 | McIntire et al. |
| 5,495,981 A | | 3/1996 | Warther |

(Continued)

FOREIGN PATENT DOCUMENTS

| | | | | |
|---|---|---|---|---|
| JP | 08169448 A | * | 7/1996 | ............. B65D 27/00 |
| JP | 09030157 A | * | 2/1997 | ............. B42D 15/02 |

(Continued)

OTHER PUBLICATIONS

Machine translation of Japanese Document No. 11-70765.*

(Continued)

*Primary Examiner* — Jes F Pascua
(74) *Attorney, Agent, or Firm* — Hanley, Flight & Zimmerman, LLC

(57) ABSTRACT

An example linerless two-ply mailer including multiple detachable elements is disclosed. The example mailer includes a first ply having opposing top and bottom edges, opposing first and second side edges substantially perpendicular to the top edge, a first face and a second face opposite the first face, and a second ply substantially the same size as the first ply and having a first face and a second face opposite the first face. The example mailer also includes a first indicia area on the first face of the first and second ply, while an adhesive is applied to adhere the second face of the first ply directly to the second face of the second ply to form the linerless mailer. At least one pattern of weakness is formed in the first and second plies and offset from each of the top and bottom edges and the first and second side edges of the first and second ply to form a removable first element and a removable second element. The first element and second element are separately removable from the mailer.

22 Claims, 6 Drawing Sheets

(56) References Cited

U.S. PATENT DOCUMENTS

| | | |
|---|---|---|
| 5,776,287 A | 7/1998 | Best et al. |
| 5,992,731 A | 11/1999 | Tani |
| 6,092,841 A | 7/2000 | Best et al. |
| 6,269,158 B1 | 7/2001 | Kim |
| 6,315,023 B1 | 11/2001 | King et al. |
| 6,520,542 B2 | 2/2003 | Thompson et al. |
| 6,596,359 B2 * | 7/2003 | Roth et al. .................. 428/40.1 |
| 6,623,039 B2 | 9/2003 | Thompson et al. |
| 6,802,538 B2 | 10/2004 | Laurash et al. |
| 6,976,709 B1 | 12/2005 | Yuen |
| D580,973 S | 11/2008 | Turner et al. |
| 7,731,239 B2 * | 6/2010 | Nishida et al. ................ 283/111 |
| 2006/0038396 A1 | 2/2006 | Thompson et al. |
| 2006/0186196 A1 | 8/2006 | Schultz et al. |
| 2007/0267862 A1 | 11/2007 | Barr |
| 2008/0138556 A1 * | 6/2008 | Emmert et al. .............. 428/41.8 |

FOREIGN PATENT DOCUMENTS

| | | | | |
|---|---|---|---|---|
| JP | 10203056 A | * | 8/1998 | |
| JP | 11070765 A | * | 3/1999 | ............ B42D 15/02 |
| JP | 2001162973 A | * | 6/2001 | |
| JP | 2006347102 A | * | 12/2006 | |

OTHER PUBLICATIONS

Machine translation of Japanese Document No. 8-169448.*

* cited by examiner

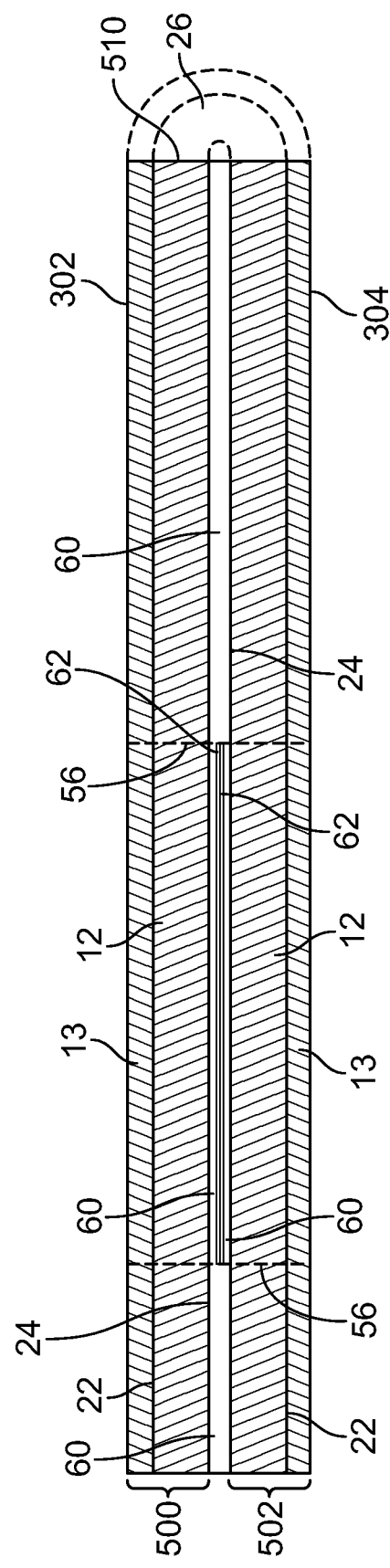

MULTI-PLY MAILER WITH MULTIPLE DETACHABLE ELEMENTS

FIELD OF THE DISCLOSURE

The present disclosure relates generally to mailers and more particularly to a multi-ply mailer with multiple detachable elements.

BACKGROUND

Mailers are commonly used for a variety of applications as an effective way to distribute information and/or promotional pieces. Mailers oftentimes come in a variety of different configurations. Such configurations may include a detachable portion such as, for example, index cards, coupons, etc. These mailers oftentimes provide cost savings in postage charges by being sent with bulk rate postage.

The detachable portion is typically die cut from the mailer, such that at least one edge of the detachable portion is common to the edge of the mailer. A recipient may then remove the detachable portion from the mailer for later use (e.g., coupon redemption, index card retention, etc.). However, the detachable portion may become removed during processing by the mail delivery system due to its location on the mailer's edge. Additionally, the removable portion is typically limited to a single ply material due to the significant manufacturing process difficultly and costs associated with additional plies.

In other examples, a two-piece mailer assembly has two separate layers of card stock combined during a manufacturing process. In this example, the two layers include a release liner sandwiched therebetween. The release liner is adhered to the interior surfaces of both of the layers of card stock.

BRIEF DESCRIPTION OF THE DRAWINGS

FIG. 8 is cross sectional view of an example mailer showing an adhesive pattern and a release coating applied over the adhesive pattern on at least one of example detachable elements.

DETAILED DESCRIPTION

Figure 1A:
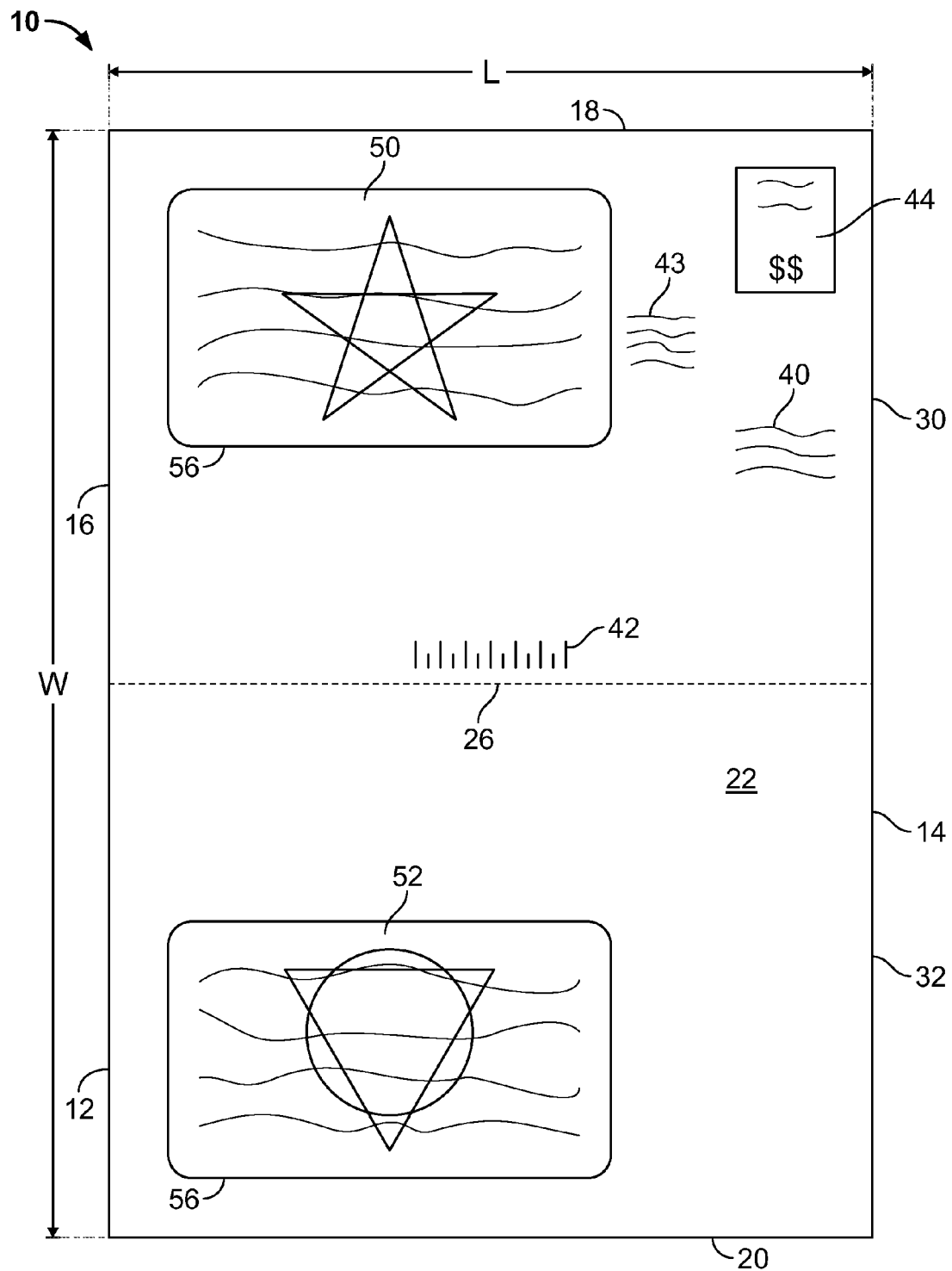
FIG. 1A is a top plan view of an example form showing a first side of the example form as described herein.

The following description of the disclosed examples is not intended to limit the scope of the disclosure to the precise form or forms detailed herein. Instead, the following description is intended to be illustrative of the principles of the disclosure.

Postcard mailers advantageously provide substantial cost savings in postage charges over some conventional letters. For example, the current cost to mail a postcard via the United States Postal Service (USPS) is less than mailing a regular non-automated letter. Such cost savings provide an incentive to utilize postcards for a wide variety of specialized mailings.

However, postcards must meet certain USPS regulations. One such regulation requires mailing pieces serving as postcards to meet particular weight (pounds per surface area) or thickness requirements. Further regulations require the postcard to have a certain thickness, weight, and/or size so that the mail piece can travel through postal sorters or other various postal equipment without difficulties. Still further, USPS regulations require specific portions of the postcard (e.g., the barcode area, the mailing address area, and the postage area) to be free from certain graphics (e.g., text, images, shading, etc.). For example, current USPS postcard regulations state that a postcard must have a height between 3.5 inches and 4.25 inches, a length between 5.0 inches and 6.0 inches, a thickness between 0.007 inches and 0.016 inches, and a weight of no more than 1 ounce. Furthermore, current USPS postcard regulations require that a barcode area be free of all graphics for a minimum of 0.625 inches from the bottom trim line, a postage area be indicia free for a minimum of 1.5 inches from the top trim line to 1.25 inches from the right side trim line, and mailing address area be substantially free of text (other than the mailing address) for a minimum of 2.75 inches from bottom the bottom trim line to a minimum of 3.5 inches from the right side trim line.

Thus, it is desirable for an outgoing mailer to qualify as a postcard to realize the postal mail savings for a postcard versus first class mail. However, such requirements often limit the use of postcards. For example, the size requirements along with the indicia-free areas of the mailer may limit the size and number of detachable portions, making the use of postcards for delivery of multiple detachable elements more difficult. Furthermore, the weight requirements may limit the number and type of layers used to construct the mailer.

An example mailer described herein satisfies the USPS postcard regulations and requirements such as, for example, weight, thickness, and size. To meet USPS postcard thickness requirements without limiting the type of manufacturing equipment that can be used, the mailer is formed from a single sheet of paper or stock. In particular, the example mailer forms described herein are formed from a single sheet of paper having approximately one-half of the thickness of the minimum USPS required thickness requirements. In this manner, the single sheet enables various or custom indicia such as, for example, personalized customer information, to be printed on a single side or both sides of the form via for example, a press machine, a laser printer, a personal printer, an industrial printer, and/or any other suitable printer.

Similarly, to meet the USPS postcard weight requirements, some of the example mailers described herein are formed without a liner between the mailer layers. For example, in the described forms, the two formed layers are adhered directly to one another and the formed detachable elements are capable of being separated from one another without the use of a liner therebetween.

Additionally, the example mailer forms described herein include two panels having multiple detachable elements (e.g., gift cards, credit cards, business cards, etc.) formed from the two adjacent panels when the form is folded as an outgoing mailer. For instance, in one example, the mailer forms include a first panel and a second panel that when folded are adhered together to form respective first and second plies of the outgoing mailer. A first detachable element is formed in the first panel, and a second detachable element is formed in the second panel. The detachable elements may be formed by any suitable method, including, for example, die-cutting, kiss-cutting, perforating, etc. Moreover, the detachable elements may be formed at anytime prior to, during, and/or after folding the form as an outgoing mailer. By forming separable multiple detachable elements within the example mailer the number of removable portions associated with a given mailer is maximized, while the space required to form the elements is minimized, thus meeting the USPS indicia requirements.

In some examples, the detachable elements are located in their respective panels such that the elements substantially overlap when the form is folded as an outgoing mailer. In other examples, the elements are substantially wholly aligned with one another. In still other examples, the detachable elements are offset, such that they do not align with one another when the form is folded as an outgoing mailer. In each example, the back sides of the detachable elements are free of adhesive and/or include a release coating such that when removed from their respective panels by the user, the detachable elements may be completely separated from the outgoing mailer and from any other detachable elements. Once removed, the detachable elements may be retained by the recipient and/or used for any suitable purposes (e.g., as a coupon, a gift card, a debit card, etc.).

Such a configuration also advantageously enables a manufacturer to print personalized data and/or other information onto both sides of the postcard as well as both sides of the detachable elements. Such personalized information may include, for example, a recipient's name, account number, personal identification number (PIN), personalized coupon code, and/or other information.

The information in the example mailer form may be any graphic (e.g., text, image, shading, etc.) human and/or machine readable, which may be pre-printed on the example form, printed on the form when the form is passed through a printer such as, for example, a print press, a laser printer, handwritten on the form, provided via a label, and/or any combination thereof.

Advantageously, the mailers disclosed herein are not limited to a postcard thickness and multiple layers may be included in the mailers for yielding thicker mailers that provide the consumer with a higher perceived value. Additionally, a single perforated (e.g. a CR 80) die will advantageously yield two or more printed and variable messaged offers on the detachable elements from a single die. Each of the example detachable elements will be one or two plies thick, depending upon how many layers the mailer is designed for and thereby correlate to the possible number of detachable elements that may be removed. In this instance, a smaller post card sized mailer can yield a plurality of wallet cards, and variable data can be concealed with the card backs positioned back-to-back. Each removable card may have different offers, such as, for example, one for the recipient, and another for another individual (e.g., a friend or family member).

Still further, in some examples, an ultraviolet (UV) varnish protection or 1-2 laminate protection may be added to the exposed surface(s) of the detachable elements and/or the surface(s) of the postcard.

Figure 1B:
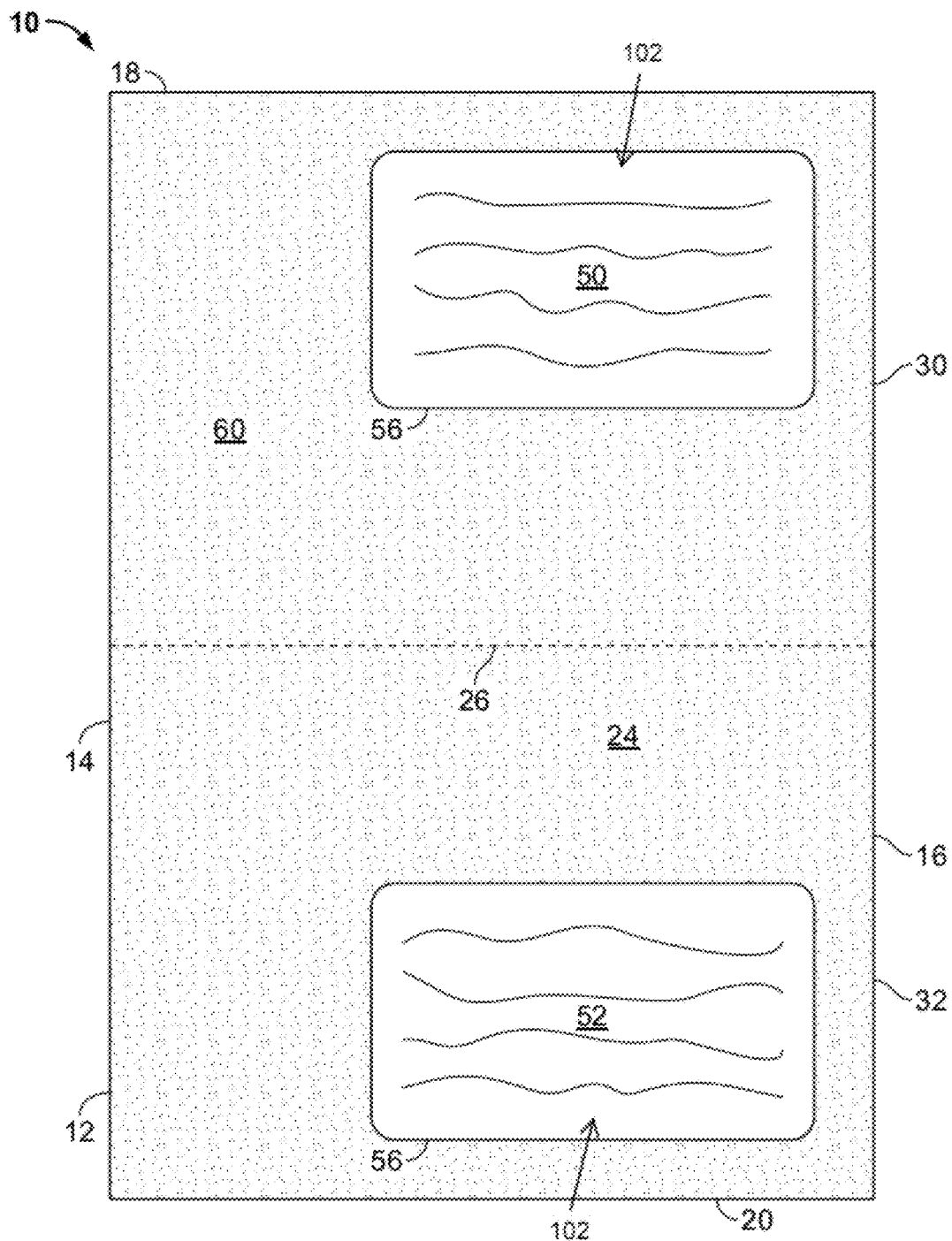
FIG. 1B is a bottom plan view of the example form of FIG. 1A showing a second side of the example form.
Figure 2:
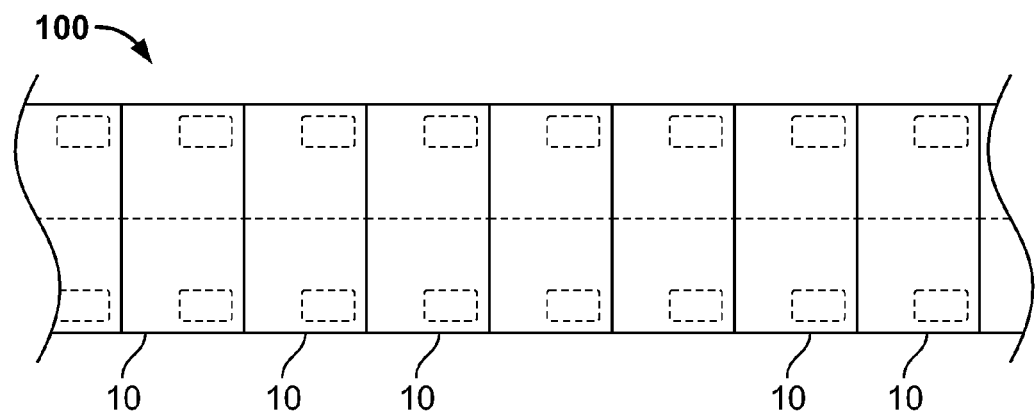
FIG. 2 is a top plan view of the example form of FIGS. 1A, 1B disposed in a continuous sheet.
Figure 6:
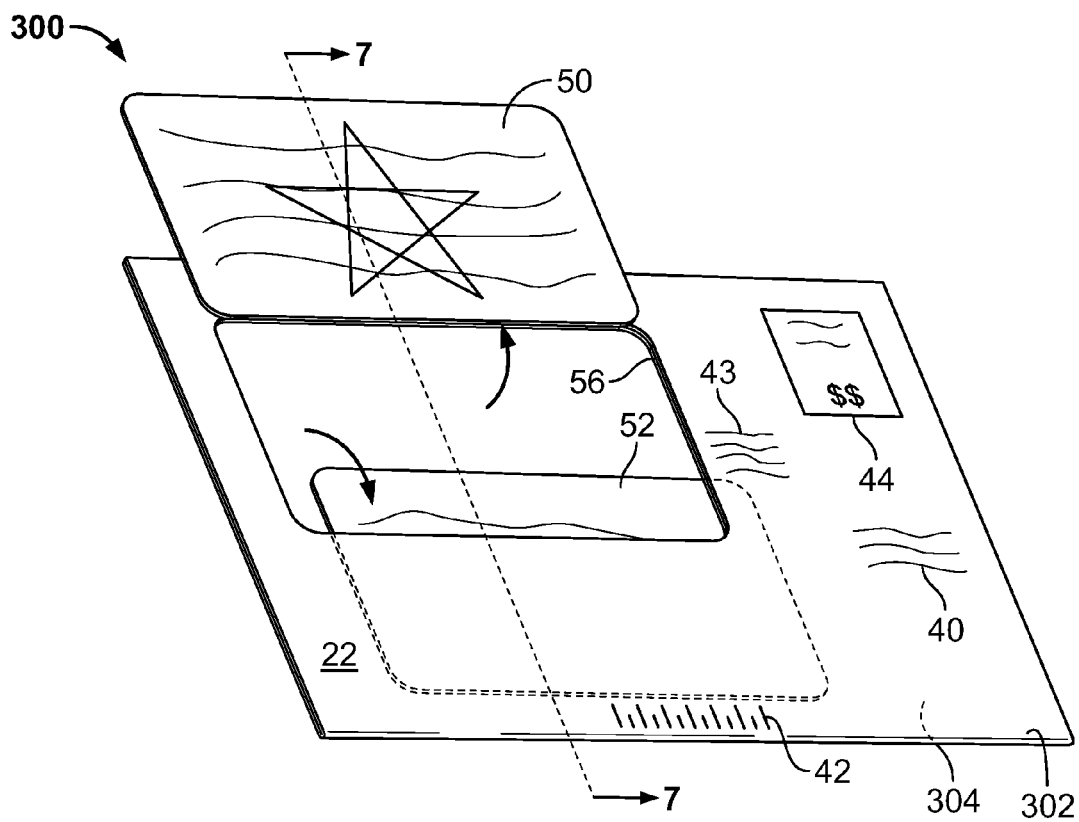
FIG. 6 is a top, front perspective view of the example mailer of FIG. 4, showing the removal of multiple detachable elements.

FIGS. 1A and 1B illustrate an example mailer form 10 described herein. Referring to FIGS. 1A and 1B, the example form 10 is formed from a single sheet of paper 12. In the example, the form 10 has approximately one half the thickness of a postcard meeting USPS requirements and regulations (e.g., 0.0035 inches thick). In one example, the form 10 is approximately 8.25 inches in width (W) by 5.875 inches in length (L). In other examples, the example form 10 may have any other suitable dimensions or sizes. Furthermore, while illustrated as a separate form, as illustrated in FIG. 2, the example form 10 may be a portion of a continuous sheet of stock 100 adapted for use in a continuous feed manufacturing machine assembly (i.e., multiple forms separated by a cutting device during manufacturing) not shown. Still further, the paper 12 may include a coating, such as, for example a laminate 13 (see FIGS. 6 and 8) covering at least a portion of at least one side of the paper 12. In the illustrated example, the laminate 13 is applied after any graphics are imprinted on the paper 12, but it will be appreciated that the graphics may be applied at anytime during the manufacture of the example form 10. Furthermore, it will be appreciated that if utilized, the coating may be applied to all or any portion of the paper 12.

The example form 10 includes parallel first and second edges 14, 16 and parallel third and fourth edges 18 and 20, respectively. In this example, the first and second edges 14, 16 are substantially perpendicular to the third and fourth edges 18, 20. The form 10 further defines a front face or first side 22 (FIG. 1A) and a back face or second side 24 (FIG. 1B).

Figure 4:
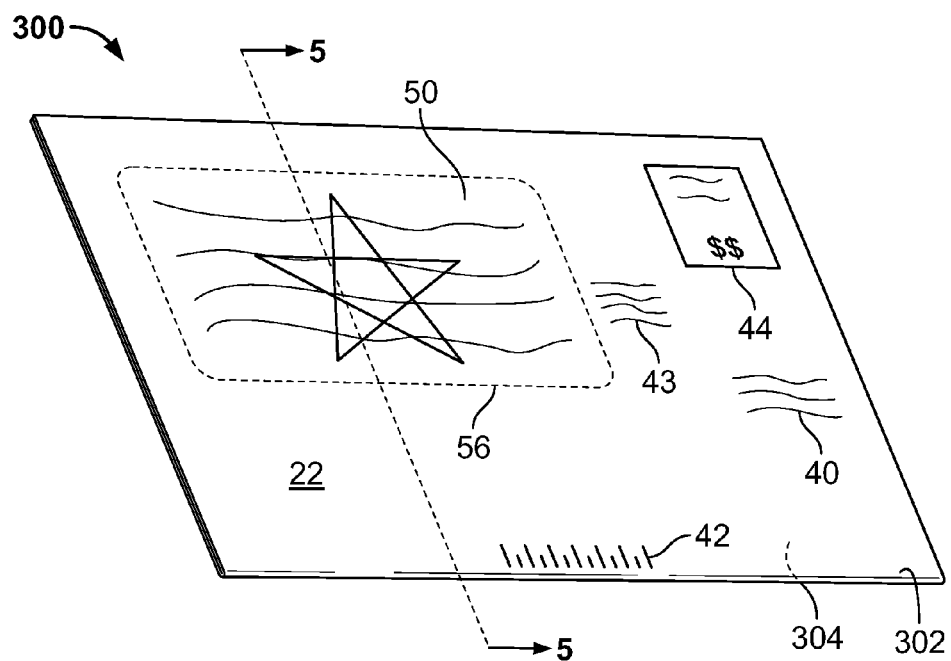
FIG. 4 is a top, front perspective view of the example mailer formed from the example form of FIGS. 1A and 1B.

The example form 10 includes a line of weakness or fold line 26. The example fold line 26 is substantially parallel to the third and fourth edges 18, 20, and extends substantially transverse to, and at least partially between the first and second edges 14, 16 for dividing or forming the form 10 into two panels 30, 32. In this example, the fold line 26 extends substantially the entire distance between the edges 14, 16 and the fold line 26 is substantially continuously formed. In other examples, the fold line 26 may extend less than the entire distance between the first and second edges 14, 16, and/or may be formed by at least two collinear fold lines. For example, the fold line 26 may be discontinuously formed. Thus, the first and second panels 30, 32, in combination, define the form 10 prior to folding as an outgoing mailer 300 described below in connection with FIG. 4. The first and second panels 30, 32 may be folded onto each other, such as for example, by plow folding, V-folding, or otherwise.

In this example, the first and second panels 30, 32 are substantially the same size (e.g., the same width and length). In other examples, the panels 30, 32 may be any suitable size such that when folded, the example form 10 forms a mailer 300 such as, for example, as described in connection with FIG. 4. The example first panel 30 is disposed adjacent to the example second panel 32.

The first and/or second panels 30, 32 may include graphics including human and/or machine readable indicia that may be pre-printed on the example form 10, printed when the form 10 is passed through a continuous feed machine and/or a printer, handwritten on the form 10, provided via a label, and/or any combination thereof. Additionally, as described below, the first and second panels 30, 32 may include personalized information relating to a particular recipient/customer of the mailer 300 and/or any other suitable information. In some examples, the second sides 24 of the first and second panels 30, 32 may include confidential information because, as explained in detail below, the second sides 24 of the first and second panels 30, 32 are hidden when the form 10 is folded as the example outgoing mailer 300, thereby assuring confidentially and show-through protection.

In this example, the first side 22 of the first panel 30 includes an area for human and/or machine readable indicia such as, for example, outgoing address information 40, postal bar coding information 42, return address information 43, and postage 44. The outgoing address information 40, postal bar coding information 42, return address information 43, and postage 44, may be directly imaged on the panel 30, or may be provided by a separate device such as, for example, a label and/or stamp.

The first side 22 of the example second panel 30 may include graphics (e.g., text, images, shading, etc) that are human and/or machine readable as desired. Such information may include, for example, advertising material, promotional discounts and/or rebates, personalized information, etc, or may be left blank.

The first panel 30 includes a first detachable element 50, and the second panel includes a second detachable element 52. The example detachable elements 50, 52 are defined by a pattern of weakness, such as, for example, perforations 56 formed in the panels 30, 32. Each of the detachable elements 50, 52 is separable from the formed mailer 300 along the defined pattern of weakness. The perforations 56 may be formed by any suitable method, including, for example, die-cutting, kiss-cutting, perforating, etc. Moreover, the detachable elements may be formed at anytime during the manufacturing of the mailer 300, including at any time prior to, during, and/or after the formation of the mailer 300. In the illustrated example, the detachable elements are positioned in the panels 30, 32 such that when the form 10 is folded about the fold line 26, the detachable elements 50, 52 overlap, and are substantially aligned with one another. The detachable elements 50, 52 may, however, be located in any suitable location within the panels 30, 32 and may not overlap and/or align with one another when the form 10 is folded to form the mailer 300.

Turning to FIG. 1B, the second face 24 of the example form 10 includes an adhesive pattern 60. The second face 24 of each of the example detachable elements 50, 52 (e.g., the second face 24 of the area defined by the perforations 56), however, is free of any adhesive pattern. The example adhesive pattern 60 is disposed on the second face 24 of each of the panels 30, 32 such that when the form 10 is folded about the fold line 26 to form the example mailer 300, the adhesive pattern 60 prevents the mailer 300 from unfolding. While the example adhesive pattern 60 is shown as covering substantially the entire face 24 of the example form 10 (minus the second face 24 of the detachable elements 50, 52), in other examples, the adhesive pattern 60 may include a variety of different adhesive patterns, including a perimeter adhesive pattern, a spot adhesive pattern, etc. Furthermore, the adhesive pattern 60 may be applied to the face 24 such that the adhesive pattern 60 does not overlap another portion of the adhesive pattern 60 when folded into the mailer 300 (e.g., a single layer of adhesive when folded).

In this example, the adhesive utilized in the adhesive pattern 60 is a permanent adhesive. However, the adhesive pattern 60 may include any suitable adhesive, permanent or otherwise, including, for example, a contact adhesive, a pressure activatable adhesive, a light activatable adhesive, a rewettable adhesive, a heat activated adhesive, and/or any other suitable adhesive or chemical fastening substance(s).

Figure 3:
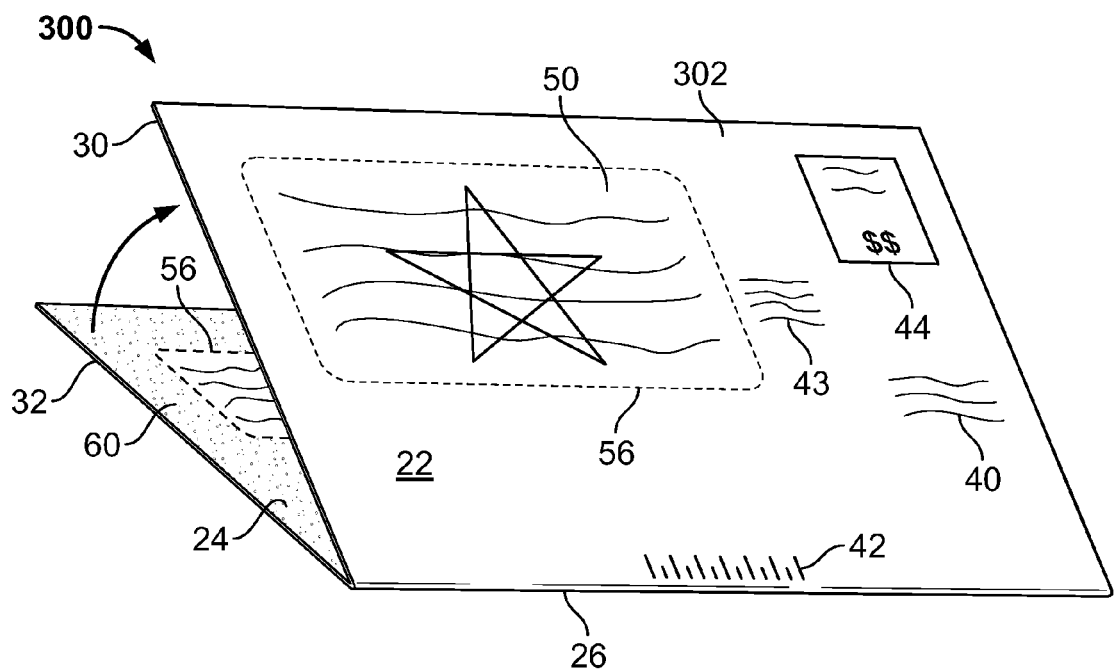
FIG. 3 illustrates the example form of FIGS. 1A and 1B being folded along a fold line to form an example mailer.

FIG. 3 illustrates the example form 10 as it is being folded about the fold line 26. When folded via, for example, a folding machine, the folded form 10 may be passed through a roller or other pressure applying devices that apply sufficient pressure to active the adhesive on the adhesive pattern 60 to secure or hold the folded form 10 as the example outgoing mailer 300 shown in FIG. 3. The example fold line 26 may be any line of weakness, including, for example, a perforation line, a die cut line, a score, a crease, etc., to facilitate folding of the example form 10. Furthermore, the example form 10 described herein is not limited to the described series and orientations of panels, and may be reversed, changed, and/or rearranged in any suitable manner. The graphics, text, or other indicia or information imaged on the first and second panels 30, 32 may be inverted, moved, exchanged, and/or otherwise located differently from the orientation shown.

Still referring to FIG. 3, the example form 10 is shown being folded about the fold line 26. As shown, when the example form 10 is folded about the fold line 26, the adhesive pattern 60 of the second side 24 of the first panel 30 is folded into contact with the corresponding second side 24 of the second panel 32 to form the mailer 300. At least a portion of the first panel 30 is adhered to at least a portion of the second panel 32 by the adhesive pattern 60 so that the mutually attached portions of the first and second panels 30, 32 each form one ply or layer of the mailer 300.

Turning to FIGS. 4-7, the form 10 of FIGS. 1A, 1B, and 3 is illustrated when folded as the example outgoing mailer 300. The example outgoing mailer 300 includes a front face 302 and a back face 304. When the example form 10 is folded as the outgoing mailer 300, the first panel 30 forms the front face 302 and the second panel 32 forms the back face 304. The area between the perforations 56 define the first detachable element 50, and the second detachable element 52. As noted above, in this example, the area between the first detachable element 50 and the second detachable 52 is free of any adhesive pattern 60. The outgoing mailer 300 may be sent and delivered to the recipient indicated in the outgoing addressee indicia 40 on the front face 302 via USPS or any other suitable delivery service.

Figure 5:
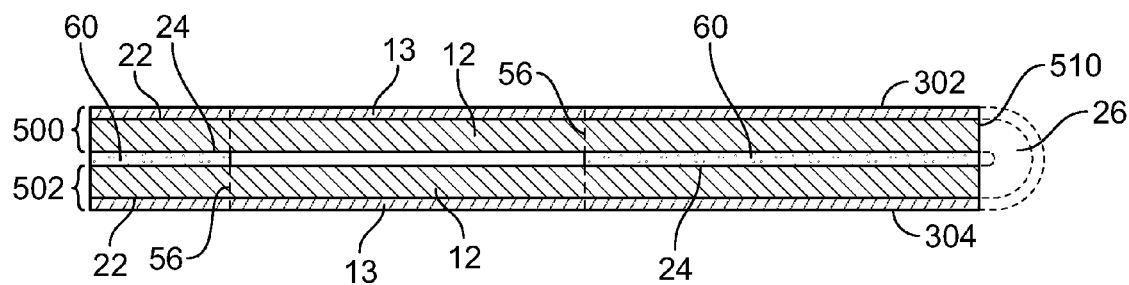
FIG. 5 is cross sectional view of the example mailer of FIG. 4, taken along line 5-5.
Figure 7:
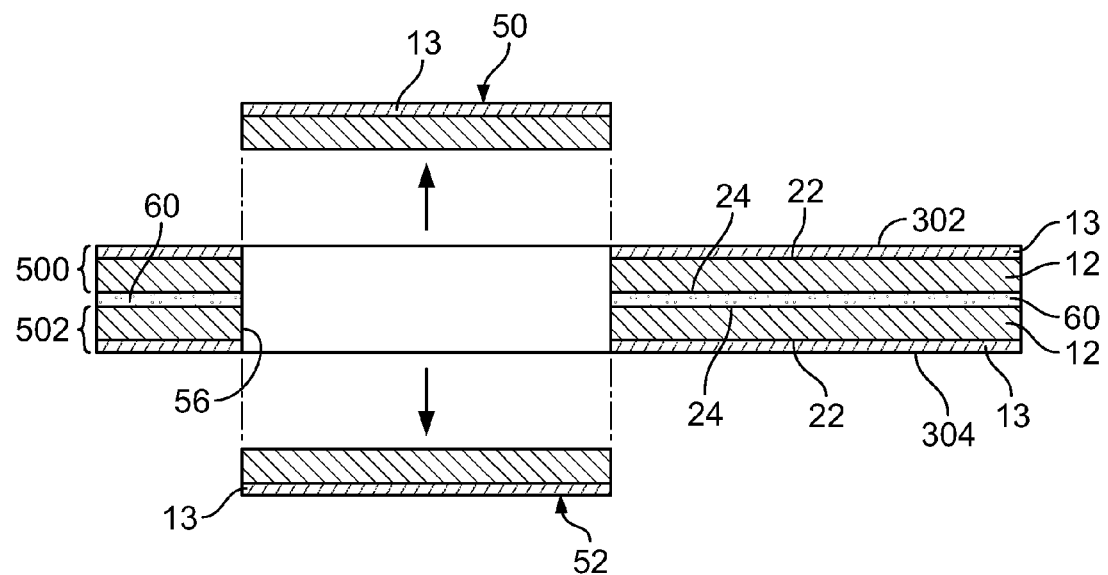
FIG. 7 is cross sectional view of the example mailer of FIG. 6, taken along line 7-7.

Referring to FIGS. 5 and 7, the example outgoing mailer 300 includes a first ply 500, and a second ply 502. The first ply 500 is defined by the laminate 13 and the substrate 12 (e.g., paper) forming one of the first panel 30 or the second panel 32. The detachable element 50 is fondled by the first ply 500 and the perforation 56. The second ply 502 is correspondingly defined by the laminate 13 and the paper 12 forming the other of the first panel 30 or the second panel 32, while the detachable element 52 is formed by the second ply 502 and the perforation 56. The first ply 500 is, in this example permanently adhered to the second ply 502 by the adhesive pattern 60. However, as noted, in this example, the area between the first detachable element 50 and the second detachable 52 is free of any adhesive pattern 60. As illustrated in FIG. 5, in one example a trim line or edge 510 may be formed through the mailer 300 to remove the fold line 26 (shown in phantom in FIG. 5). The formed mailer 300 may be sent through a suitable mail delivery system to a recipient.

To remove the detachable elements 50, 52, the recipient applies a force sufficient to tear the detachable elements 50, 52 from the outgoing mailer 300 along the perforation 56, such as, for example by using a finger, pencil, letter opener, or otherwise by tearing the perforation 56. Because the detachable elements 50, 52 do not have any adhesive between them, the detachable elements are separately removable as illustrated in FIG. 7. Additionally, the detachable elements 50, 52 may be removed from the mailer 300 without destroying and/or separating the plies 500, 502, of the mailer 300 itself.

Once either or both of the detachable elements 50, 52 are removed from the mailer 300, the recipient may utilize them in any suitable fashion. For example, the detachable elements 50, 52, may be utilized as a coupon, a debit card, a business card, PIN number, etc. Moreover, because the second faces 24 of each of the detachable elements 50, 52 are hidden when formed as a mailer 300 (and thus when mailed) and prior to removal by the recipient, the graphics (e.g., text, images, etc.) imaged on the second faces 24 of the elements 50, 52 may be personal and/or confidential in nature, and are revealed only when the recipient removes the elements 50, 52. For added security, the graphics imaged on the second face 24 of the elements 50, 52 may include additional security features such as scratch-off coatings, hidden text, encryption, etc.

In another example and as shown in FIG. 8, the adhesive pattern 60 of the mailer 300 may extend over at least a portion of the second face 24 of at least one of the detachable elements 50, 52. In this instance, at least one of the detachable elements 50, 52 may include a release coating 62 sufficient to prevent the detachable elements 50, 52 from adhering to the adhesive pattern 60. Accordingly, while the formed mailer 300 may include an adhesive pattern 60 that extends between at least a portion of the detachable elements 50, 52, the applied release coating 62 will allow the two elements 50, 52 to be separated from one another by the recipient.

Although certain example apparatus and articles of manufacture have been described herein, the scope of coverage of this patent is not limited thereto. On the contrary, this patent covers all apparatus and articles of manufacture fairly falling within the scope of the appended claims either literally or under the doctrine of equivalents.

I claim:

1. A linerless two-ply mailer including multiple detachable elements comprising:
   a first ply having opposing top and bottom edges, opposing first and second side edges substantially perpendicular to the top edge, a first face and a second face opposite the first face;
   a first indicia area on the first face of the first ply;
   a second ply substantially the same size as the first ply and having a first face and a second face opposite the first face;
   a second indicia area on the first face of the second ply;
   a barcode area free of graphics on the first face of the first ply to receive a barcode;
   a postage area on the first face of the first ply;
   an adhesive covering the entire second face of the first ply and the second ply, the adhesive to adhere the second face of the first ply directly to the second face of the second ply to form the linerless mailer; and
   at least one pattern of weakness formed in the first and second plies and offset from each of the top and bottom edges and the first and second side edges of the first and second ply to form a removable first element and a removable second element, the first element and the second element being separately removable from the mailer, a portion of the mailer between the at least one pattern of weakness and the top and bottom edges and the first and second side edges comprising the first indicia area, the barcode area, and the postage area, wherein at least one of the removable first element or the removable second element includes a release coating applied to the second face over the adhesive.

2. A mailer as defined in claim 1, further comprising a coating adhered to at least one of the first face of the first ply or the first face of the second ply.

3. A mailer as defined in claim 2, wherein the coating is a laminate.

4. A mailer as defined in claim 1, wherein the pattern of weakness is a perforation.

5. A mailer as defined in claim 1, wherein the first element and the second element overlap when the mailer is folded.

6. A mailer as defined in claim 5, wherein the first element and the second element substantially align when the mailer is folded.

7. A mailer as defined in claim 6, wherein the first element and the second element are defined by a single pattern of weakness.

8. A mailer as defined in claim 1, wherein the first ply and the second ply are permanently adhered to one another.

9. A mailer as defined in claim 1, further comprising a graphic imaged to the second face of at least one of the first ply or the second ply.

10. A mailer as defined in claim 1, wherein the mailer is a postcard.

11. A mailer as defined in claim 1, wherein the first ply and the second ply are formed from a single sheet, and wherein the single sheet is folded about a fold line to form the first ply and second ply.

12. A mailer as defined in claim 11, wherein the fold line is removed after forming the first ply and second ply.

13. A two-ply mailer including a plurality of detachable cards comprising:
    a first ply having opposing top and bottom edges, opposing first and second side edges substantially perpendicular to the top edge, a first face and a second face opposite the first face;
    a first indicia area on at least one of the first face or second face of the first ply;
    a second ply substantially the same size as the first ply and having a first face and a second face opposite the first face;
    a second indicia area on at least one of the first face or second face of the second ply;
    a barcode area free of graphics on the first face of the first ply to receive a barcode;
    a postage area on the first face of the first ply;
    an adhesive covering the entire second face of the first ply and the second ply, the adhesive to adhere the second face of the first ply directly to the second face of the second ply to form the linerless mailer; and
    a card-shaped pattern of weakness formed in the first and second plies to form a removable first card and a removable second card, a portion of the mailer between the card-shaped pattern of weakness and the top and bottom edges and the first and second side edges comprising the first indicia area, the barcode area, and the postage area, wherein at least one of the removable first card or the removable second card includes a release coating applied to the second face over the adhesive.

14. A two-ply mailer as defined in claim 13, wherein the first ply and the second ply are formed from a single sheet, and wherein the single sheet is folded about a fold line to form the first ply and second ply.

15. A two-ply mailer as defined in claim 13, further comprising a coating adhered to at least one of the first face of the first ply or the first face of the second ply.

16. A two-ply mailer as defined in claim 15, wherein the coating is a laminate.

17. A two-ply mailer as defined in claim 13, wherein the first card and the second card overlap when the mailer is folded.

18. A two-ply mailer as defined in claim 13, wherein the first card and the second card substantially align when the mailer is folded.

19. A two-ply mailer as defined in claim 13, wherein at least a portion of the first ply and the second ply are permanently adhered to one another.

20. A method of forming a two-ply mailer having first and second removable cards comprising:
    providing a sheet of stock having a first face and a second face opposite the first face;
    creating a fold line dividing the sheet into a first panel and a second panel substantially the same size as the first panel;
    imaging indicia on at least one of the first face or the second face of the sheet;

applying an adhesive to the entire second face of the first panel and the second panel;

folding the sheet along the fold line;

adhering the second face of the first panel to the second face of the second panel; and creating a pattern of weakness through the first panel and second panel offset from the edges of the first panel and the second panel to form a first removable card and a second removable card, wherein the second face of the first removable card and the second face of the second removable card are separable by providing a release coating to at least one of the second face of the first removable card or the second face of the second removable card, wherein a portion of the mailer between the pattern of weakness and top and bottom edges and side edges of the sheet comprises an indicia area, a barcode area, and a postage area, the barcode area being free of graphics to receive a barcode.

21. A method as defined in claim 20, further comprising coating the first face of the sheet.

22. A method as defined in claim 21, wherein the coating is a laminate.

* * * * *